March 12, 1940.  R. W. ERDLE  2,192,902
METHOD OF MOLDING DENTURES
Filed Jan. 20, 1936   2 Sheets-Sheet 1
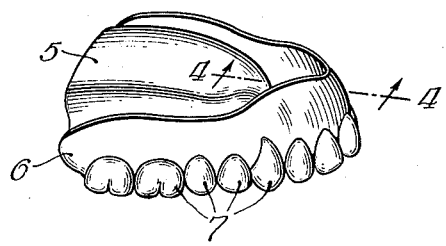
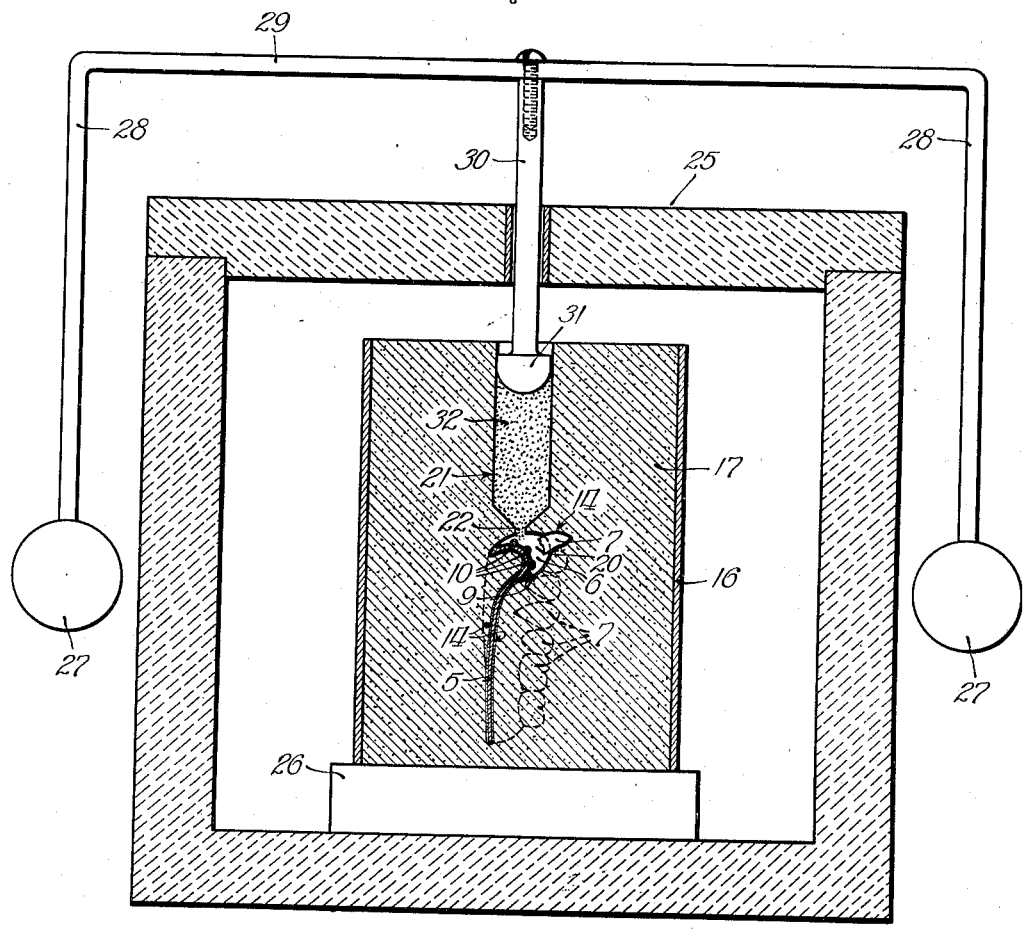
Inventor:
Reiner W. Erdle
By: Drury, Jackson, Butcher & Dienner
Attys.

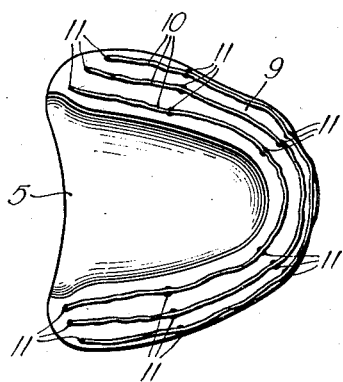
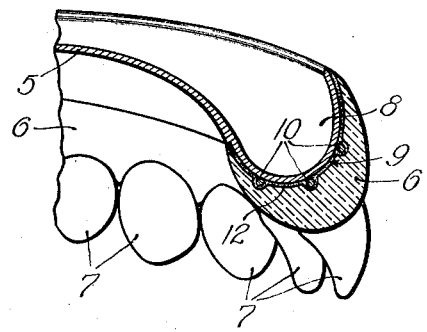
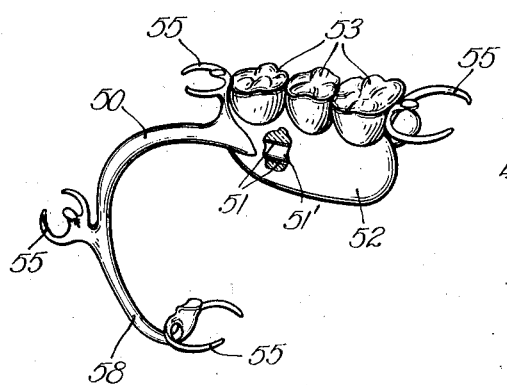
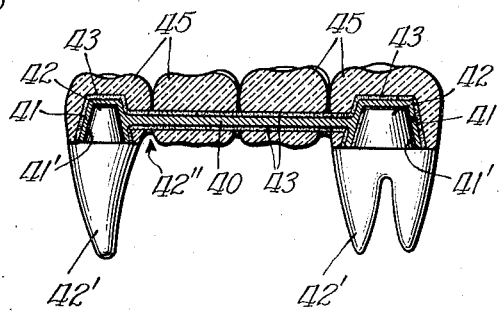

Patented Mar. 12, 1940

2,192,902

UNITED STATES PATENT OFFICE 2,192,902

METHOD OF MOLDING DENTURES

Reiner W. Erdle, Chicago, Ill., assignor to Dental Research Corporation, a corporation of Illinois Application January 20, 1936, Serial No. 59,816

2 Claims. (Cl. 18—55.1)

This invention relates to dentures and has to do with an improved method of producing porcelain and metal combinations for dentures and dental parts, and with an improved porcelain and metal combination for devices of this sort.

It is to be understood that the invention is not limited to the particular devices with which I shall describe the same hereinafter in connection with the drawings.

Porcelain and metal combinations have been produced before but they have involved great labor cost, and the results have not always been as good as desired. Heretofore, the porcelain part has been produced by a building up process involving a number of firings or bakings, i. e., a firing or baking process after each installment of porcelain. There are only a few mechanics in this country who are skilled enough to build up devices of this type, and this is the reason why devices produced in this manner have not been profitable.

One of the main objects of the present invention is to produce porcelain and metal combinations for dentures and dental parts without the building up and repeated firing or baking processes of the prior art and in a simple and inexpensive manner which will produce uniformly good results without requiring any exceptional skill on the part of the mechanic.

Another object is to provide an improved porcelain and metal combination for dentures and dental parts wherein the metal part of the denture or appliance embodies a high degree of rigidity as measured by modulus of elasticity.

Further objects and advantages and numerous adaptations of the invention will be apparent from the following detailed description taken in connection with the accompanying drawings in which:

Figure 1 is a perspective view of one form of completed porcelain and metal denture embodying the present invention;

Figure 2 is a more or less diagrammatic sectional view showing the method of and means for forming the denture shown in Figure 1, in accordance with the present invention;

Figure 3 is a bottom plan view of the metal base of the denture shown in Figures 1 and 2 before application of the porcelain thereto;

Figure 4 is a sectional view taken on the line 4—4 of Figure 1;

Figure 5 is a side elevational view, partially in section, showing another form of appliance formed in accordance with and embodying the present invention; and Figure 6 is a perspective view showing another form of appliance constructed in accordance with and embodying the present invention.

Referring to the drawings, the denture shown in Figures 1 to 4, inclusive, is in the form of a dental plate which may be either full or partial. This plate comprises a metal base 5 and a porcelain gum part 6 having porcelain teeth 7, which may be either stock teeth to which the gum part 6 is molded or teeth molded in one piece with the gum part.

The base 5 is preferably formed of a metal embodying a high degree of rigidity as measured by modulus of elasticity so as to prevent undue deflection under imposed loads and to support and strengthen the porcelain part of the denture. A metal with a rigidity comparable with or exceeding that of the porcelain is preferably employed. A metal like that disclosed in Charles H. Prange Patent No. 1,958,446, dated May 15, 1934, or like that disclosed in the copending application of Charles H. Prange, Serial No. 725,651, filed May 14, 1934, is suitable for use in connection with the present invention. I do not, however, intend to be limited to these particular metals as other metals having the desired rigidity may be employed, and so far as the broader aspects of forming the porcelain and metal combination are concerned, metals such as high fusing white gold without this characteristic of rigidity as measured by modulus of elasticity may be employed.

The metal base 5 is formed at 8 to fit the alveolar ridge, and the surface 9 to which the porcelain gum part 6 is molded is preferably provided with retention means. The particular retention means shown comprises a plurality of wires 10 crimped throughout their length and spot-welded or otherwise secured at spaced locations at 11 to the surface 9.

Unless the porcelain and metal have the same coefficient of expansion, it is desirable to provide a layer 12 of ceramic material or metal between the denture metal and the porcelain in order to prevent checking of the porcelain. This layer 12 is preferably of a somewhat yielding material to relieve the porcelain of stresses resulting from different thermal expansion and contraction between the metal and the porcelain. The layer 12 may be applied over all surfaces 9 of the metal part of the denture, to or around which the porcelain is to be molded, and around the retention means 10. This coating may be sprayed upon the denture metal or otherwise applied as a coating thereto as by painting the same on the denture metal, and where the coating is a ceramic coating, it comprises a refractory material and a binder, such as silica and silicate of soda, silica and tetra-ethyl silicate, or a mixture of silica (refractory), finely ground asbestos (plasticizer), naphthalene (for creating porosity), and a binder of organic silicate or sodium silicate or the like. Of course other refractories like alumina, zirconia, or the like, may be used. Plastic clay is another satisfactory binder, and it may be used as a binder for the refractory aggregate in the same manner as the other binder above mentioned.

One satisfactory material for the coating 12 may be formed by mixing powdered flint with a mixture of 50% of silicate of soda, diluted ten to one, and 50% of a mixture of diluted di-glycol stearate. To 100 c. c. of this paste is added one c. c. of hydrochloric acid to effect the setting of the paste. This paste is sprayed to or otherwise applied as a coating on the denture metal, as above set forth. Potassium carbonate may also be used with this material up to 10% with desirable results.

Another material for forming the coating 12 between the porcelain and the denture metal may be formed by mixing about ten to twenty parts water to one part silicate of soda and powdered flint to make a paste that may be sprayed upon the denture metal or otherwise applied as a coating as by painting the same on the denture metal.

Instead of making this coating of the material above described, it may comprise a hydrolyzed binder composed of tetra-ethyl silicate approximately 50%, alcohol approximately 40%, and water approximately 10%. The actual procedure of hydrolyzing the tetra-ethyl silicate is generally as follows: First take the fifty parts by volume of tetra-ethyl silicate, add the forty parts of alcohol, and shake thoroughly. Then add the ten parts by volume of water slightly acidulated with approximately .007% of hydrochloric acid. Powdered flint and asbestos are also added to make a paste that may be applied to the denture metal as above set forth. The definite percentages may, of course, vary widely within the scope of the present invention.

In making up this coating, clay, or any other highly refractory material may be used with or in lieu of the flint content of the coating.

Instead of forming the layer 12 of ceramic material, this layer may be formed of metal foil, such as platinum or gold foil, adapted to the surface 9 of the metal base 5 of the denture and spot-welded to retain it in place.

A wax or other meltable pattern is then adapted to or formed upon the surface 9 of the metal plate 5 to the desired shape and configuration of the porcelain gum part 6 of the denture. The teeth 7 are set up and articulated on the wax pattern. As already explained, these teeth may be stock teeth formed of porcelain, or wax teeth may be used to form the porcelain teeth as a unitary part of the porcelain gum part 6.

The wax pattern is attached to a sprue which is large enough to hold the amount of porcelain required to fill the mold. The sprue, metal base 5, and wax pattern and teeth 7 are then coated at 14 with a material which will not combine with the fused porcelain and which, at the same time, will give the mold cavity a smooth finish. This material may be similar to the material forming the ceramic layer 12 between the porcelain and metal parts of the denture, as above described. The material formed by mixing powdered flint with a mixture of 50% of silicate of soda, diluted ten to one, and 50% of a mixture of diluted di-glycol stearate with one c. c. of hydrochloric acid added to 100 c. c. of this paste to effect the setting of the paste is suitable for this purpose. As before, this paste is sprayed to or otherwise applied as a coating over the entire assembly, and potassium carbonate may be added up to 10% with desirable results. Or this material may be formed by mixing about ten to twenty parts water to one part silicate of soda and powdered flint to make a paste that may be sprayed upon the metal, wax pattern, and teeth, or painted thereon. Or it may be made of a hydrolyzed mixture of tetra-ethyl silicate approximately 50%, alcohol approximately 40%, and water approximately 10%. This solution is acidulated with approximately .007% hydrochloric acid, and powdered flint and asbestos are added to make a paste that may be applied as above set forth, or any other highly refractory material which will not combine with the fused porcelain and which is finer than the rough outer investment material, may be used with or in lieu of the flint content of the coating 14.

When this coating is applied, the water evaporates and leaves a coating which will not combine with the fused porcelain, and which, at the same time, gives the mold cavity a smooth finish which cannot be obtained with the rough outer investment material. It is thought that this coating absorbs the tetra-ethyl binder of the investment material where that material is like the investment material disclosed in my copending application Serial No. 48,071, filed November 4, 1935.

This coating 14 also prevents oxidation of the metal part 5 of the denture during the molding of the porcelain part thereon, as will hereinafter be described.

The coated metal base with the wax pattern on the surface 9 thereof, and the teeth 7 set in the wax pattern, is then placed in an investment flask or ring 16 and embedded in the investment material forming the body 17 of the mold. The ring 16 is preferably formed of "Nichrome," or any metal alloy which retains its strength at high temperatures. To protect the ring 16 against oxidation and so that the metal will not burn off when the ring is subjected to high temperatures for relatively long time intervals, this ring is preferably coated with a clay wash or other wash suitable for this purpose. This wash may be applied by spraying the same on the ring or dipping the ring therein, or otherwise as desired.

Instead of making the ring 16 of a metal alloy, this ring may be made of fire-clay or any ceramic material which retains its strength at high temperatures.

The body 17 of the mold is preferably formed of an investment material which has thermal characteristics which are compatible with the thermal characteristics of the porcelain which is being molded. Breakage and inaccuracy of the product are avoided, and the results are highly satisfactory.

The refractory mold material which I employ has a thermal expansion upon heating, as distinguished from a permanent expansion or contraction, so that when it comes back to room temperature it will have the original dimensions. That is, there preferably is no appreciable permanent expansion or contraction as a result of heating, but the mold material expands as a result of thermal expansion while it is heated, and thereupon contracts again upon cooling to room temperature. This is important because the porcelain which is being molded is necessarily at the same high temperature as the mold while it is being molded, and it must necessarily shrink when it is brought down to room temperature.

The thermal expansion of the mold may be controlled, depending upon the composition of the mold material. Fused quartz may be added to the mixture to reduce the thermal expansion, or cristobalite may be added to increase the expansion. Also, other materials, such as alumina, may be used in admixture for similar purposes.

Fused quartz, ground to pass through a sixty-mesh sieve, with some larger and finer particles, and an addition of approximately one-fifth by volume of finely ground pure flint makes an excellent refractory body having the properties and advantages above set forth. This material has thermal characteristics compatible with the thermal characteristics of the porcelain upon heating to the relatively high temperatures where the porcelain starts to flow. These temperatures are approximately 1700° F. to 2000° F. for low fusing porcelain, approximately 2000° F. to 2300° F. for medium fusing porcelain, and approximately 2300° F. to 2500° F. for high fusing porcelain.

Ground firebrick of coarser mesh, i. e. about 20 to 40 mesh, may be employed in lieu of the fused quartz referred to in the preceding paragraph.

This highly refractory investment material is used in amount to form the body 17 of the mold, and I admix therewith in amount to serve as a binder for the refractory investment material, as disclosed in my copending application Serial No. 27,566, filed June 20, 1935, a binder such as that more fully disclosed in United States Letters Patent No. 1,909,008, dated May 16, 1933, to Charles H. Prange.

As disclosed in the foregoing patent, this binder is preferably composed entirely of pure silica gel. As pointed out there, silica gel, as is well known, is a colorless and transparent substance which exists in varying degrees of firmness. When it embodies a large amount of water it is soft and pasty, like gelatine, and when it is dehydrated it becomes extremely hard, glassy and brittle.

Silica gel is available on the market in its hard and glassy condition, but so far as is now known there is no practical way of utilizing it in this condition to serve the purpose of the prior patent, or for the purpose of the present application. This form of the mold body 17 of the present invention therefore involves the procedure of the prior patent, whereby pure silica gel may be caused to be generated, in situ, in a plastic mixture, as will hereinafter appear.

As in the above patent, I resort to the characteristic of colloidal silicic acid to undergo a spontaneous sort of transformation, whereby silica gel is generated or formed in a continously increasing manner. The exact chemical transformation which silicic acid undergoes is not fully understood, but there is apparently a spontaneous and increasing aggregation of colloidal silica particles resulting, ultimately, in a complete conversion of the silicic acid into what is commonly known as silica gel.

The binder which I employ in accordance with this form of the mold body of the present invention is a substance which is adapted in the foregoing general manner to form or generate pure silica gel. More specifically, it has been found that certain organic silicates, preferably silicon esters, when hydrolyzed and slightly acidified, are admirably characterized by the ability to undergo a spontaneous transformation with the ultimate generation of nothing more than pure silica gel.

For example, in the preferred method of forming the investment material for the mold body 17, a silicon ester of the general class which includes, e. g., tetra-ethyl silicate, tetra-butyl silicate, tetra-methyl silicate, glyceryl silicate, or diglycol silicate, is conditioned or treated by the addition of a slight amount of an acidifying agent, and, by the addition of water, if necessary, to produce a liquid or semi-liquid susbtance which is satisfactorily usable as a binder to form a paste or plastic mixture with the refractory filler above described. Such mixture is adapted to be poured, handled, or manipulated in a suitable manner and is characterized by an ability to set or harden without a drying out process. This action is probably due to a formation of a colloidal silicic acid and to a subsequent spontaneously increasing transformation of the silicic acid into a silica gel, the latter ultimately becoming more and more dehydrated until it is entirely solid.

The setting of the material may be accelerated in a variety of ways, as, for example, by heat; but, in practicing the present invention, I prefer to incorporate with the plastic mixture a slight amount of suitable accelerating agent whereby the setting is sufficiently complete to permit handling within a short time. Magnesium oxide powder may be used for the accelerating purpose, although other accelerating agents are contemplated within the scope of the present invention. Hexamethylenetetramine ($C_6H_{12}N_4$) is a very satisfactory accelerator and has the advantage that, in being organic, it will be completely eliminated in the firing operation.

I find that insead of using an accelerator, the desired accelerated setting may be obtained by increasing the acidity of the binder.

The general nature of the preferred investment material of the present invention and the essential features thereof, as well as the numerous advantages achieved thereby, will be more fully understood by more specifically setting forth an illustrative example. It is to be understood, however, that the procedural steps and the proportions of the parts and other details, as hereinafter set forth, are given merely by way of illustration and are capable of wide variations to suit different requirements.

One method of making the mold or investment material which has proven to be satisfactory consists in first producing a binder by properly treating and conditioning liquid tetra-ethyl silicate. With about eight volumes of this organic silicate, I mix about one volume of water and a trace of a suitable acidifying agent, e. g., a few drops of hydrochloric or sulphuric acid, thereby inducing a partial hydrolysis. Since these liquids will not readily mix, it is preferable to add a small amount of a material which is miscible with all. For example, I prefer to add one or two volumes of ethyl alcohol or acetone whereby a true and thorough mixture of the liquid is readily produced. This common solvent may be omitted, and a high speed mechanical agitation employed to obtain the desired miscibility. The amount of acid to be used will vary with requirements, but should be, preferably, just sufficient to make the mixture very slightly acid when tested with litmus paper.

The mixture may then be stirred on a water bath until a sample, upon drying upon the hand, for example, is sticky to the touch or otherwise tested and found to be in suitable condition. Usually a period of one to two hours will suffice.

This produces the binder heretofore referred to and having the characteristics hereinbefore mentioned. And this binder may be used immediately, or it may be stocked for a reasonable period of time, to be used when required.

In making up the investment material I mix approximately four parts of the investment material, as above described, with about one part of the liquid binder. There will be some variation in the amount of binder used, depending upon the type of material and upon the type of investment material, the foregoing proportions being suitable for making up an investment material in accordance with this invention and for the purposes herein set forth. The excess binder may be readily eliminated by vibrating the composition to cause the solid parts thereof to settle, and to cause the excess liquid to rise to the top. The liquid binder which comes to the top in the vibrating process may be poured off. It is to be understood that to start with the proportions of one part liquid binder to four parts of refractory filler are approximately correct, but that in the manipulative procedure the mass of filler with the liquid binder is subjected to vibration over a period of time which settles the filler in a compact mass at the bottom and changes the liquid solid ratio from the proportions when first mixed. If preferred, a relatively greater proportion of filler may be used, in which case the plastic composition of refractory filler and binder may be produced by kneading it.

This plastic material will normally set in a period of three to six days, but the speed of initial setting is preferably increased by either of two methods.

One satisfactory porcedure lies in heating the mixture in an oven to approximately 110–115° C. This heating apparently speeds the transformation of the colloidal silicic acid into colloidal silica particles, and an initial set can be secured in approximately an hour or less.

The method which I prefer to use to speed the initial setting of the mixture is to incorporate with the pasty material a trace of suitable accelerating agent. While various materials will do, I have found an accelerator of the class hereinbefore set out to be extremely satisfactory and preferable for this purpose. A trace or slight amount of this accelerating agent is sufficient, and I prefer to use it by mixing it directly with the refractory filler before the pasty material is produced. In carrying out this procedure, I use about one part by weight of the accelerator to one thousand parts by weight of the refractory investment material. This is equivalent to one-tenth of one per cent by weight. The composition, when thus produced, takes an initial set in about half an hour or less.

While I cannot fully explain the action of this accelerating agent, I have found that a variety of accelerators may be used. These accelerators may be of a character to be completely or practically eliminated by heat, thereby leaving the mold free, or substantially free, of extraneous inorganic solids. Where the accelerating agent is a liquid, it is preferably mixed with the binder and where it is a solid, it is preferably mixed with the refractory filler.

After making the investment material as above set forth, this material is poured or otherwise introduced in plastic form into the flask or ring 16 in which the coated denture assembly, comprising the metal part, wax pattern and teeth 7, has been placed and the metal part, wax pattern and teeth, and sprue or gate forming part 10 are completely embedded in this investment material. After the ring 16 has been filled with investment material with the sprue or gate forming part projecting therefrom, the mold body 17 is set and the wax pattern is eliminated, leaving the fixed molding cavity 20 lined with the coating material 14 for obtaining the desired smooth finish and which, at the same time, will not combine with the fused porcelain, and which protects the metal part 5 against oxidation and the sprue or gate opening 21 opening vertically from the top of the mold. The sprue or gate opening 21 is preferably of a diameter of about one-half to three-quarters of an inch, and is preferably restricted at 22 to facilitate removal of the porcelain projection formed at the lower end of the sprue or gate opening in molding the porcelain part of the denture.

I find also that mixtures of refractory material with plaster of Paris as a binder may be successfully used, and I contemplate such materials as a mold material suitable for use in connection with the present invention in lieu of the mold material previously described.

These plaster investments may be made up, for example, of one part of hydrocol, one part of finely ground or powdered flint, five parts of ground firebrick, and a small amount of boric acid, borax, feldspar, epsom salts, or any material which will flux the investment body at elevated temperatures to give the desired strength.

An investment in which plaster is the binder and fused alumina, fused magnesia, ground quartz, pulverized alumina, or other known refractory materials may be combined to form a suitable investment.

After the foregoing operations, the porcelain, in powder or rock form, is inserted in the opening 21 left by the sprue. If more than one shade of porcelain in the denture or denture part is required, the combination of the desired color porcelain may be inserted in the sprue in the order and amount to produce the desired effect of shade variety of denture or denture part. The mold is then placed in a suitable furnace, indicated more or less diagrammatically at 25. The interior of the furnace 25 is provided with a base 26 for supporting the mold body in its flask or ring 16 in raised position. Where the teeth 7 are stock teeth, the mold body 17 supports these teeth in proper position with respect to each other during the time the porcelain is being placed in the mold and while the porcelain is heated and pressed into the cavity to fill the same and until it has cooled and set with the teeth firmly anchored therein. The mold body 17 also supports the metal part 5 in proper position with respect to the mold cavity and with respect to the teeth, where the teeth are stock teeth formed of porcelain.

The furnace 25 is then heated with as little heat as required to enable the porcelain to flow into and fill the mold cavity 20 formed by the elimination of the wax pattern and, where the teeth are formed of wax, by the elimination of these wax teeth to fill such cavity throughout. The desired pressure for pressing the porcelain into the mold cavity 20 may be imposed by weights 27 at the lower ends of arms 28 on the frame 29 which may be disposed externally of the furnace, as shown. In one practical embodiment of the invention, a weight 27 of about fourteen pounds at the lower end of each of the arms 28 was found to be satisfactory. The lower end of the center arm 30 rests upon a plunger or button 31 which fits relatively snugly in the sprue or gate opening 21, and presses the porcelain, indicated at 32, ahead of it and into the mold cavity 20 under the influence of the weights 27. The arm 30 operates slidingly through an opening in the upper wall of the furnace 25. This arm 30 and the button 31 may be formed of non-metallic material, such as fire-clay or other ceramic material.

In a practical embodiment of the invention, the heat was raised until the plunger 31 started to move downwardly and the molding process was carried out with a temperature from approximately 100 degree F. to 200 degrees F. below the normal fusing point of the porcelain. This is an important aspect of the present invention. A porcelain consisting of about 30% china clay, 25% Feldspar and 45% calcined alumina has a fusing point of approximately 3200 degrees F. but becomes plastic and moldable at about 2800 degrees F. This indicates that very high fusing porcelains may be molded at temperatures considerably below the normal fusing point. Overheating with the objectionable results thereof are avoided, and a strong, dense porcelain without discoloration is assured. Heating below the normal fusing point of the porcelain not only produces a strong, dense porcelain without discoloration but a porcelain in which the translucency is increased; also very high fusing porcelains can be handled without exceeding the refractory limits of the mold materials available. At the same time, by pressing the porcelain into the mold cavity 20 while heated sufficiently to flow into and fill said cavity and without discontinuing the heat while the porcelain is being pressed into the cavity, chilling of the porcelain is avoided, and exceedingly thin cavities of large extent may be filled throughout. The resulting porcelain part is of uniform and exceedingly fine physical characteristics, and the building up and repeated firing or baking processes of the prior art are avoided.

After the mold cavity is completely filled, the molded article is allowed to cool slowly, and when cooled, is removed from the mold. The investment material forming the mold body 17 sinters but does not fuse during the firing process. Therefore it can be removed from the denture or other article with a steel brush, or by picking it away from the article.

Instead of placing all of the porcelain in the gate and filling the mold by pressing the porcelain from the gate into the mold cavity, it is possible to do it somewhat differently, namely, to grind up the porcelain to fairly fine fragments, make a paste of it with water or alcohol, and then to vibrate it down into the mold cavity so as substantially to fill it. Additional porcelain is placed in the gate. The whole assembly is placed in the furnace and the procedure from then on is as above described. The difference is that only the amount of porcelain necessary to complete the filling of the mold cavity is fed in from the gate by the process previously described.

The porcelain gum part 6 is molded against and thereby joined to the metal part and, as a result, these two elements are not required to be joined after the porcelain is removed from the mold.

After the denture, indicated as a full denture in Figure 1, is removed, the porcelain gum part 6 and, if desired, the teeth 7, may be stained and glazed to suit the requirements.

If porcelain having substantially the same coefficient of expansion as the denture metal is obtainable, the cushioning effect of the layer 12 may be eliminated or disregarded, but in such case the teeth 10 would preferably be made out of the same porcelain.

The denture shown in Figure 5 is of the fixed bridge type, comprising a metal bar 40 having secured to its opposite ends metal copings 41 adapted to be applied and cemented at 41', or otherwise secured in the usual manner, upon the prepared portions 42 of the natural teeth, the roots of which are illustrated at 42'. The gum line is shown at 42''.

The bar 40 and copings 41 are preferably formed of a metal embodying a high degree of rigidity as measured by modulus of elasticity, as set forth in connection with the metal part of the preceding embodiment of the invention.

Unless the porcelain and metal have the same coefficient of expansion, it is desirable, as before, to provide a layer 43 of metal or ceramic material between the denture metal and the porcelain in order to prevent checking of the porcelain. This layer 43 may be formed of platinum or gold foil adapted to the surfaces of the bar 40 and copings 41, and spot-welded to retain it in place. Instead of forming this layer of metal, it may be formed of ceramic material as set forth in connection with the preceding embodiment of the invention.

A wax or other meltable pattern is then adapted to or formed upon the bar 40 and copings 41 to the desired shape and configuration of the porcelain teeth 45. The wax pattern is attached to a sprue, and the entire assembly is coated and invested as described in connection with the preceding embodiment of the invention, whereupon the wax is eliminated. The porcelain is then introduced into the opening left by the sprue and may be shaded as previously explained, and the mold is placed in a suitable furnace which is heated, and, simultaneously with the application of this heat, the porcelain is pressed slowly and continuously into the mold cavity and molded to the bar 40 and copings 41 in the manner set forth in connection with the preceding embodiment of the invention.

The denture shown in Figure 6 is a typical lingual bar type denture. It comprises a lingual bar 50 which is preferably formed of a metal having a high degree of rigidity as measured by modulus of elasticity, as set forth in connection with the metal parts of the preceding embodiments of the invention.

As before, unless the porcelain and metal have the same coefficient of expansion, a coating 51 of somewhat elastic character is applied to the portion 51' of the bar 50 or around which the porcelain 52 is molded. This coating 51 may be a coating of ceramic material or a metal foil, as described in connection with the preceding embodiments of the invention. A wax or other meltable pattern is then adapted to or formed upon the coated portion 51' of the bar 50 to the desired shape and configuration of the porcelain part 52, and the teeth 53 are set up and articulated on the wax pattern. These teeth may be stock teeth formed of porcelain, or wax teeth may be used to form the porcelain teeth 53 as a unitary part of the porcelain part 52.

The wax pattern is attached to a sprue and the entire assembly is coated, as before, and invested, whereupon the wax is eliminated and the porcelain introduced. The mold is then introduced into a furnace which is heated to enable the porcelain to flow into and fill the mold cavity and, simultaneously with the application of such heat, the porcelain is pressed slowly and continuously into the mold cavity and molded to or around the coated portion 51' of the bar 50, as more fully set forth in connection with the preceding embodiments of the invention.

Clasps 55 are secured to the bar 50 for anchoring the denture to the natural teeth, as well understood in the art. These clasps may be formed of "Vitallium" or any other suitable clasp metal fastened to the bar 50 by spot-welding, or they may be formed as a unitary part of the bar 50, or otherwise suitably attached thereto.

The portion 58, or any other desired portion of the lingual bar 50, may be provided with a porcelain gum part having a tooth or teeth thereon similar to the parts 52 and 53 shown and described.

I do not intend to be limited to the precise details shown or described.

I claim:

1. The method of forming a denture having a metal part and a porcelain part, which comprises forming a mold cavity contiguous to the metal part, heating said cavity prior to filling same with porcelain, heating the porcelain outside said cavity to a temperature at which it will flow into said cavity, simultaneously with the heating of the cavity and the porcelain subjecting the heated porcelain to pressure to force same into the cavity to fill all portions of the cavity and mold the porcelain part to shape contiguous to said metal part, and simultaneously with the molding of said porcelain part to shape joining same under heat and pressure to said metal part.

2. The method of forming a denture having a metal part and a porcelain part, which comprises applying a coating to the metal part, forming a mold cavity contiguous to the coated surface of the metal part, heating said cavity prior to filling same with porcelain, heating the porcelain outside said cavity to a temperature at which it will flow into said cavity, simultaneously with the heating of the cavity and the porcelain subjecting the heated porcelain to pressure to force same into the cavity to fill all portions of the cavity and mold the porcelain part to shape contiguous to the coated surface of said metal part, and simultaneously with the molding of said porcelain part to shape joining same under heat and pressure to the coated surface of said metal part.

REINER W. ERDLE.